Nov. 25, 1958 V. W. BOLIE 2,861,475

MEANS FOR DIGITALLY VARYING ROTATIONAL VELOCITIES

Filed Sept. 7, 1956

5 Sheets-Sheet 1

INVENTOR.
VICTOR W. BOLIE

BY Moody and Goldman

ATTORNEYS

Nov. 25, 1958 V. W. BOLIE 2,861,475

MEANS FOR DIGITALLY VARYING ROTATIONAL VELOCITIES

Filed Sept. 7, 1956 5 Sheets-Sheet 2

INVENTOR.
VICTOR W. BOLIE
BY Moody and Goldman
ATTORNEYS

INVENTOR.
VICTOR W. BOLIE
BY Moody and Goldman
ATTORNEYS

Nov. 25, 1958 V. W. BOLIE 2,861,475

MEANS FOR DIGITALLY VARYING ROTATIONAL VELOCITIES

Filed Sept. 7, 1956 5 Sheets-Sheet 4

INVENTOR.
VICTOR W. BOLIE
BY Moody and Goldman
ATTORNEYS

Nov. 25, 1958 V. W. BOLIE 2,861,475

MEANS FOR DIGITALLY VARYING ROTATIONAL VELOCITIES

Filed Sept. 7, 1956

5 Sheets-Sheet 5

INVENTOR.
VICTOR W. BOLIE
BY Moody and Goldman
ATTORNEYS

United States Patent Office 2,861,475

Patented Nov. 25, 1958

2,861,475

MEANS FOR DIGITALLY VARYING ROTATIONAL VELOCITIES

Victor W. Bolie, Cedar Rapids, Iowa, assignor to Collins Radio Company, Cedar Rapids, Iowa, a corporation of Iowa Application September 7, 1956, Serial No. 608,467

12 Claims. (Cl. 74—681)

This invention relates to a system that can provide a large number of output rotational-velocities, which are digitally related.

The invention can provide digital indications of its output velocities in any number system. Accordingly, it may use any radix, such as two for the binary system and ten for the decade system. Design considerations will govern which radix is most convenient in a given situation.

Transmission devices capable of providing a large plurality of controllable rotational velocities are required in many and differing types of mechanisms. For example, they may be utilized in lathes, gear hobbers, milling machines, tone wheels, audio frequency generators, wind-tunnel blower drives, and coil winders that can provide variable-pitch windings.

It is, therefore, a primary object of this invention to provide mechanical-transmission means which can have a control indication that allows selection of rotational output velocities according to a digital code.

It is another object of this invention to provide mechanical-transmission means that can be controlled directly by a digital control panel which may be remotely located.

It is still another object of this invention to provide mechanical-transmission means which may be controlled from memory devices, such as punch-cards, perforated tape, memory drums, magnetic tape, etc.

It is a further object of this invention to provide mechanical-transmission means which may have a fixed incremental change between adjacent output velocities, wherein the incremental change may be as large or as small as required.

The output rotational velocities provided by the invention can be proven to be related by the following expression:

$$W_{out}=W_{a\ldots k}+\frac{1}{R}\left(W_{a\ldots k}+\frac{1}{R}\left(W_{a\ldots k}+\frac{1}{R}W_{d\ldots t}\right)\right)\ldots) \qquad (1)$$

where $W_{out}$ is any of the output rotational velocities of the invention, R is the radix of the chosen number system, $W_{a\ldots k}$ is any rotational velocity from a set of R number of harmonically-related rotational velocities that are spaced in velocity steps of $R^F$ revolutions-per-unit-of-time, in which F is any integer including zero; and $W_{d\ldots t}$ represents any rotational velocity from a set of R number of harmonically-related rotational velocities that are spaced in the same velocity steps of $R^F$ revolutions-per-unit-of-time. The lowest velocity $W_a$ in the set $W_{a\ldots k}$ is defined as follows:

$$W_a=R^F M\ (R-1) \qquad (2)$$

where M is a design factor for a given system and will be any integer including zero. The highest velocity $W_t$ in the set $W_{d\ldots t}$ is defined as follows:

$$W_t=R^F\ (M+1)\ (R-1) \qquad (3)$$

Generally, a design factor of zero is preferred because it usually provides the simplest form of design for the invention; and the illustrative forms of this invention, described in detail below, use design factors of zero. When M is zero, the sets $W_{a\ldots k}$ and $W_{d\ldots t}$ are identical.

Expression 1 may be expanded to prove the digital relationship of the invention. The expansion provides the following type of series:

$$N=R^n S_{a\ldots g}+\cdots+R^2 S_{a\ldots g}+R S_{a\ldots g}+S_{a\ldots g}+R^{-1} S_{a\ldots g}+R^{-2} S_{a\ldots g}+\cdots+R^{-p} S_{a\ldots g} \qquad (4)$$

where N is a number suitable for digital representation, R is the radix of the chosen number system, $S_{a\ldots g}$ is any one of the basic digits in the number system having the radix R, and $n$ and $p$ are limiting powers of the series.

The invention utilizes a plurality of digital transmission units connected in tandem. Each unit has a pair of input velocities X and Y, and an output velocity Z. The velocities of each unit are interrelated by the following formula:

$$z=\frac{AY+X}{R} \qquad (5)$$

where A is a proportionality constant, and R is the chosen radix.

Input Y is a value within the sets $Y_{a\ldots k}$ or $Y_{d\ldots t}$ wherein the product AY falls within the appropriate set $W_{a\ldots k}$ or $W_{d\ldots t}$.

One input X of the second and each following unit is connected to the output Z of its adjacent preceding unit. Input X of the first unit is zero (or no rotational velocity). Output Z of the last unit in the system generally provides the output of the invention.

The invention also includes a digital indicating unit with each digital transmission unit. Each indicating unit indicates a basic digit in the chosen number system; and the selected digit determines the velocity of input Y. Each digit has a digital weight, defined by Expression 4, that is based upon the position of its digital transmission unit in the connected sequence of the combination of digital transmission units.

In order to obtain a direct digital indication in the chosen number system of radix R, the velocities AY, which are in the set $W_{d\ldots t}$ provided for the first digital unit, are indicated by the basic digits of the chosen number system in the order of their correspondingly increasing values. For example, in the decade system with M equal to one, a set of velocities $W_{d\ldots t}$ might be 1000, 1100, 1200, . . ., 1900 revolutions-per-minute, which would be indicated as 0, 1, 2, . . ., 9, respectively. In the same case, the velocities in the set $W_{a\ldots k}$ provided for the second and each following digital unit are indicated by the same basic digits of the chosen number system; and they likewise are correlated in the order of their correspondingly increasing values. For example, in the decade system with M equal to one, a set of velocities $W_{a\ldots k}$ might be 900, 1000, 1100, . . ., 1800 revolutions-per-minute that would also be indicated as 0, 1, 2, . . ., 9, respectively.

The invention also includes velocity selection means for each digital transmission unit to select the velocities $W_{a\ldots k}$ and $W_{d\ldots t}$ according to the digital indication of each respective unit. The velocity selection means will often be a clutching system that connects the selected velocity.

Further objects, features, and advantages of this invention will be apparent to a person skilled in the art after thorough study of this specification and drawings, in which:

Figure 1 basically illustrates the invention;

Figure 1:
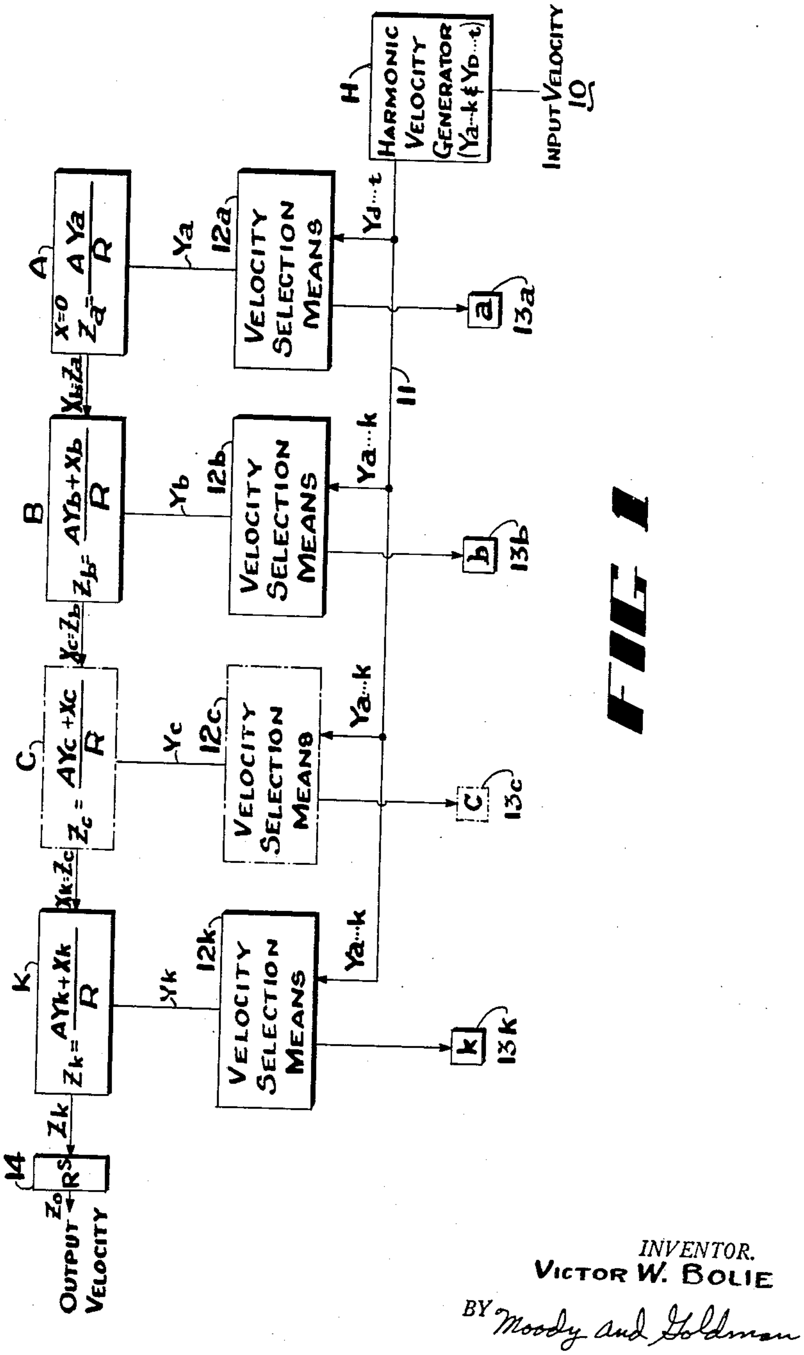

Now referring to the invention in more detail, Figure 1 illustrates the basic components of the invention. There are a plurality of digital units A, B, C . . . K. Although four such units are shown any number over two may be used; and unit C (shown in broken lines) represents any number of intermediate units. Each unit, except the first unit A, has two input velocities X and Y and a single output velocity Z. The rotational velocity components of each digital unit are related as specified by Expression 5 above. The input X of the first unit is zero velocity.

All units may be made identical, it merely being necessary to maintain input X of the first unit non-rotational to make it zero.

Any type of conventional transmission may be used which is capable of providing the input-output relationships specified by Expression 5. Differential-gear transmissions or planetary-gear transmissions are particularly adaptable as the digital units, and they will be used in the illustrative forms of the invention below.

A harmonic-velocity generator H generates the plural velocities Y for the respective digital units from an input velocity 10. Velocities Y need not be true harmonic velocities, but must be convertible to true harmonic relationship when injected into the digital units if a direct digital indication is desred. Thus, generator H can generate pseudo-harmonic velocities that are the true harmonic velocities multiplied by a multiplication factor $1/A$.

Hence, generator H provides two sets of velocities $Y_{a \ldots k}$ and $Y_{d \ldots t}$ which obtain the true harmonic sets $W_{a \ldots k}$ and $W_{d \ldots t}$ respectively, after multiplication by the transmission factor A which may be any value including one. This may be stated as follows:

$$Y_{a \ldots k}=\frac{1}{A}W_{a \ldots k} \tag{6}$$

and $$Y_{d \ldots t}=\frac{1}{A}W_{d \ldots t} \tag{7}$$

The outputs of generator H are provided independently of each other; and these plural velocities are represented for drawing simplicity by the single line 11 in Figure 1. Consequently, R number of separate velocities $Y_{d \ldots t}$ are provided for use by first digital unit A; and the R number of separate velocities $Y_{a \ldots k}$ are provided for use by each of the other digital units.

In the simplest form of the invention, design factor M in Expressions 2 and 3 above is chosen to be zero. In such case, $Y_{a \ldots k}$ equals $Y_{d \ldots t}$ and generator H need only provide a single group of velocities for both sets.

A velocity selection means 12 is provided with each digital unit to select its respective input from the plural outputs Y of generator H. Therefore, velocity selection means 12*a* provides an output $Ya$, which is a selected one of the velocities $Y_{d \ldots t}$. Each of the remaining velocity selection means 12*b*, 12*c* and 12*k* provides a respective output $Yb$, $Yc$ and $Yk$, which is independently selected as one of the velocities $Y_{a \ldots k}$. Each velocity selection means 12 will generally be a clutch system for selecting its desired output velocity.

A plurality of indicating means 13*a*, 13*b*, 13*c* and 13*k* connect respectively to the velocity selection means 12*a*, 12*b*, 12*c* and 12*k* to provide the basic digits in the chosen number system. Thus, each of the indicators 12 will indicate one of the basic digits of the selected number which correlates with its selected velocity Y, as described above.

Each of the digital units will have an increasingly greater weight in the chosen number system going from right to left in Figure 1, according to the exponents in Expression 4. Thus, a direct reading digital number is provided by the order of indicators 13*a*, 13*b*, 13*c* and 13*k*. A digital point among the indicators 13 is determined by values of $R^F$ in Expressions 2 and 3 above and by the number of digital transmission units in the system.

A final transmission unit 14 may be provided to receive the output $Z_k$ of the last digital unit K and transmit it with a transmission ratio $R^S$, in which S is an integer that may be zero, positive or negative. Transmission unit 14 is not a digital unit and merely affects the position of the digital point among indicator units 13; and it often will not be used, in which case the output of the invention will be $Z_k$.

The velocity increment $\Delta V$ between adjacent output velocities $Z_0$ of the invention is defined by the following expression:

$$\Delta V=\left[\frac{R^F}{R^N}\right]R^S \tag{8}$$

where N is the number of digital transmission units preceding the output.

Furthermore, the range of output velocities of the invention is defined as follows:

$$\text{Output velocity range}=R^F M \text{ to } R^F (M+1)\ R^S \tag{9}$$

In a special case where direct digital indication is not required, and only a fixed velocity step is required between adjacent output velocities $Z_0$ in Figure 1, the exponents F and S in Expressions 2, 3, 8 and 9 will not be an integer but can be any value.

Figure 2:
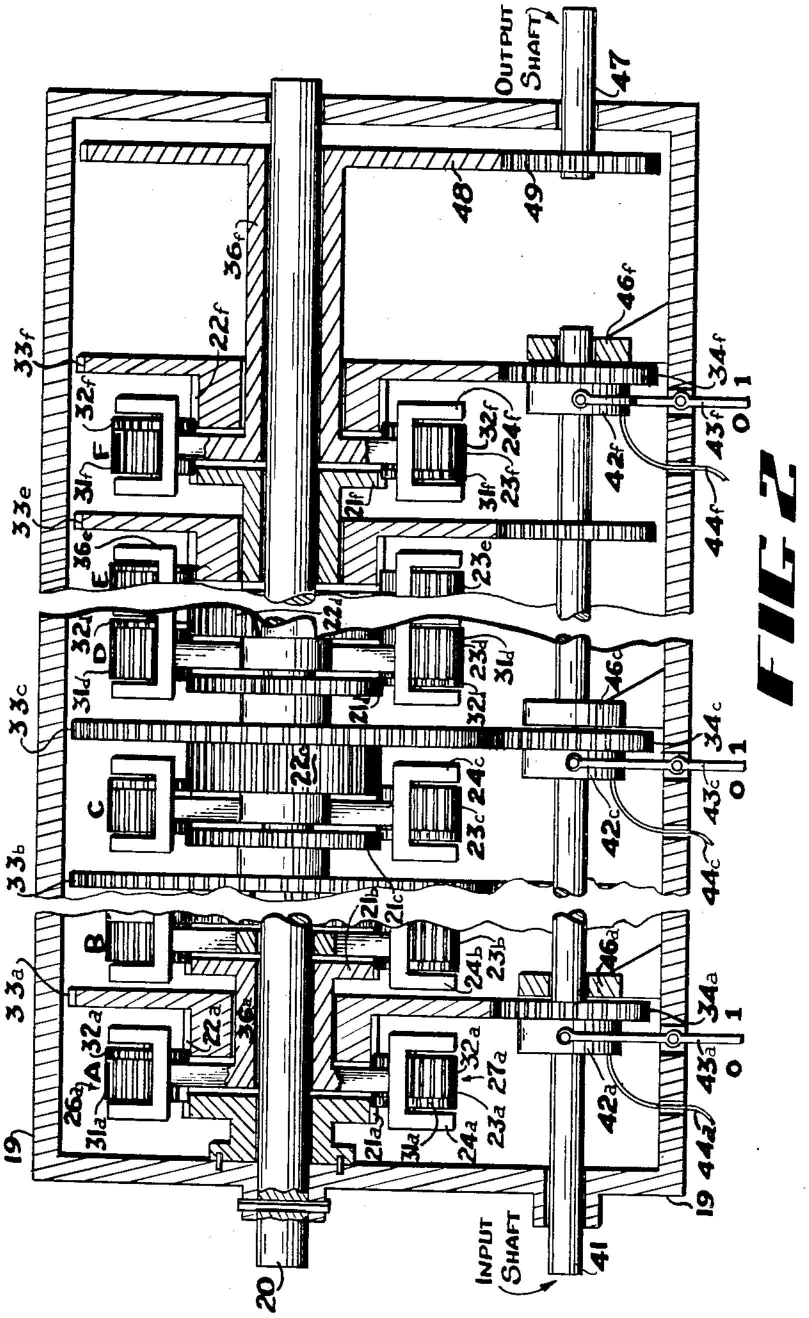
Figure 2 is an illustrative form of the invention utilizing the binary number system.
Figure 8:
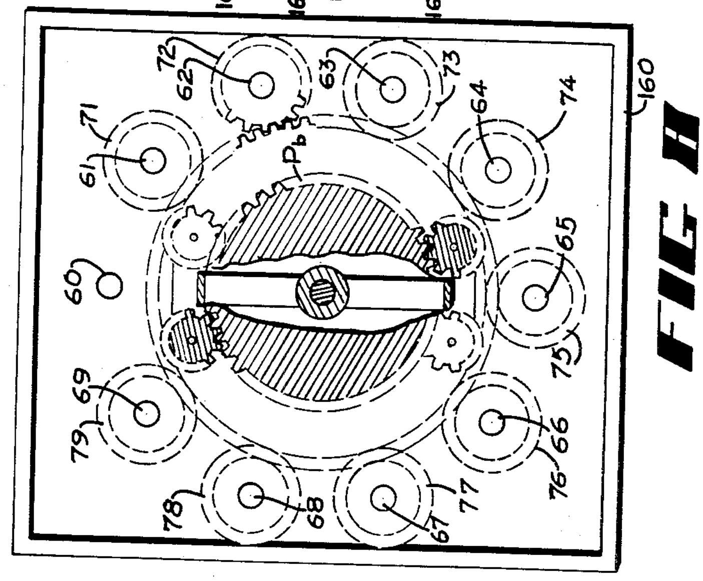
Figure 8 is a sectional view taken along 8—8 in Figure 7.

Figure 2 illustrates a broken sectional view of an example of the invention that uses the binary number system and has a design factor M equal to zero. It utilizes a plurality of spur-gear type of differential transmission units A through F, which are all rotatably supported on a shaft 20 fixed to a frame 19. Each differential unit A through F has an X-input gear 21, a W-input gear 22, and a symmetrical carriage gear arrangement 23 and comprises one of the digital units of the binary system. A differential gear arrangement of the same type, although in another system, is shown in Figure 8.

Carriage gear arrangement 23 in each differential gear in Figure 2 contains a carriage 24 on which two pair of gears 26 and 27 are mounted symmetrically. Each pair of gears is identical to the other. Each pair comprises gears 31 and 32, which engage each other, and accordingly rotate in opposite directions. Carriage gears 31 engage input-X gear 21, while the other carriage gears 32 engage input W-gear 22. A Y-input gear 33 is fixed with each W-input gear 22 but has a larger diameter. Each gear 33 receives input Y from a respectively smaller gear 34*a* through 34*f*. Each carriage 24 provides the output Z of each digital unit by a coaxial shaft 36 which connects between carriage 24 of one unit and X-input gear 21 of the following digital unit.

The transmission ratio between gears 34 and 33 provides the constant A specified above. Thus in Figure 2, gears 33 and 34 may be assumed to have a one-to-three-ratio to provide A with a value of ⅓ in Figure 2.

In the binary system, there are only two basic digits zero and one, which are two in number because R is two in the binary number system. Since M is zero for Figure 2, the same two velocities comprise the sets $W_{a \ldots k}$ and $W_{d \ldots t}$. Furthermore, the smallest of the two velocities is zero, using Equation 2 above. The other velocity, specified by Expression 3, is then $R^F$; and this is the spacing between the adjacent velocities in the set. For example, if F is assumed to be seven, the second input velocity is 128 revolutions-per-minute. Because A is ⅓ in Figure 2, the input velocity sets $Y_{a \ldots k}$ and $Y_{d \ldots t}$ each include the velocities zero and 384 revolutions-per-minute to satisfy Equations 6 and 7 above.

The harmonic-velocity generating means in Figure 2 is provided by input shaft 41 and a set of clutches. Shaft 41 hence uses an input velocity of 384 revolutions-per-minute. Shaft 41 is also the output shaft of the binary harmonic-velocity generator of Figure 2. The gears 34 are concentrically supported on shaft 41; and a different one of gears 34 engages the respective input-Y gear 33 of each differential unit.

A plurality of clutches 42, *a* through *f*, provides the respective velocity selection means in Figure 2. Each clutch 42 is connected to a respective gear 34 and is operated either mechanically by a lever 43 or electromagnetically through leads 44. Each clutch 42 is a two-position device, wherein one position locks its gear 34 to frame 19, and the other position locks its gear 34 to rotating shaft 41. Thus, when lever 43 is moved to indicated position zero, it moves its gear 34 to the right in Figure 2, where it becomes freely rotatable on shaft 41, but where it frictionally engages the surface of a projection 46 fixed to frame 19. Gear 34 is then locked to frame 19. Consequently, Y-input gear 33 is then locked to frame 19.

The other position of clutch 42, which is obtained when lever 43 is moved to indicated position one, moves gear 34 to the left in Figure 2, where it is frictionally released from projection 46, and where it is locked to shaft 41. Here, Y-input gear 34 rotates at 384 revolutions-per-minute and, therefore, rotates gear 33 and Y-input gear 22 at 128 revolutions-per-minute.

Thus, the two clutch positions for each clutch 42 permits independent selection of either of the binary inputs Y for its respective digital unit according to a binary indication. The internal parts of the clutch are not shown, but it is well known how a two-position clutch of the described type may be constructed.

The position of each lever 43 thus provides the respective indicating means, with the basic digit, zero, being indicated when the digital unit receives zero velocity, and the basic digit, one, being indicated when the digital unit receives the 384 revolution-per-minute velocity.

An output shaft 47 provides the output of the binary system in Figure 2, and it is provided with an output transmission ratio of two-to-one by gears 48 and 49. Thus, S in Formulas 8 and 9 is one end and $R^S$ is two. Consequently, the six digital units in Figure 2 provide an output velocity for output shaft 47 which varies over a range from zero to 256 revolutions-per-minute with velocity increment of 4 revolutions-per-minute.

Furthermore, any of the speeds provided by output shaft 47 is directly indicated by the positions of levers 43, neglecting the digital point which can be readily provided.

Figure 6:
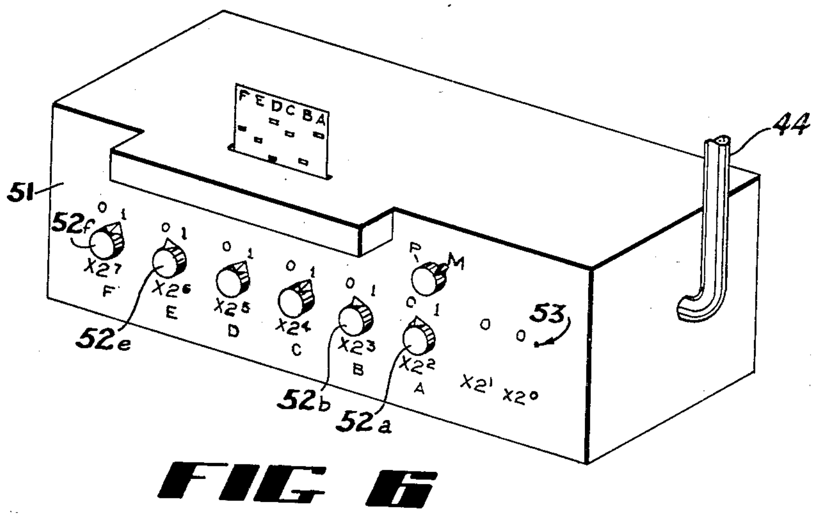
Figure 6 illustrates one type of control panel, which may be used with the binary system of Figure 2.

Also, a control panel 51 such as shown in Figure 6 may be used, which has six switches **52*a* through 52*f* that respectively control the two positions of each electromagnetic clutch 42 in Figure 2, through respective connecting wires 44*a* through 44*f*. The switches indicate the binary number 1 0 1 1 0 0 0 0. which is 88 in the decade system and which indicates that many revolutions-per-minute. The two zeros on the left are inserted so that a digital point 53** may be used to obtain a direct reading from the dial indication in Figure 6.

Furthermore, a sequence of different velocities for output shaft 47 in Figure 2 may be easily obtained by a punch card or perforated tape system as shown in Figure 6, wherein the tape contains a number of rows of perforation, A through F, which correspond to the digital units, A through F, in Figure 2. Each row has holes that can cooperate with a respective photoelectric relay (not shown), which is known in the art of punch card and perforated tape systems. Or switch levers (not shown) may be directly actuated by the holes in the tape. The tape may be moved at a synchronous speed to variably control the output velocities of shaft 47 according to a predetermined sequence. Therefore, each punch-card or tape controlled switch operates a respective electromagnetic clutch 42 in Figure 2 in the same manner as switches 52.

Figures 3, 4:
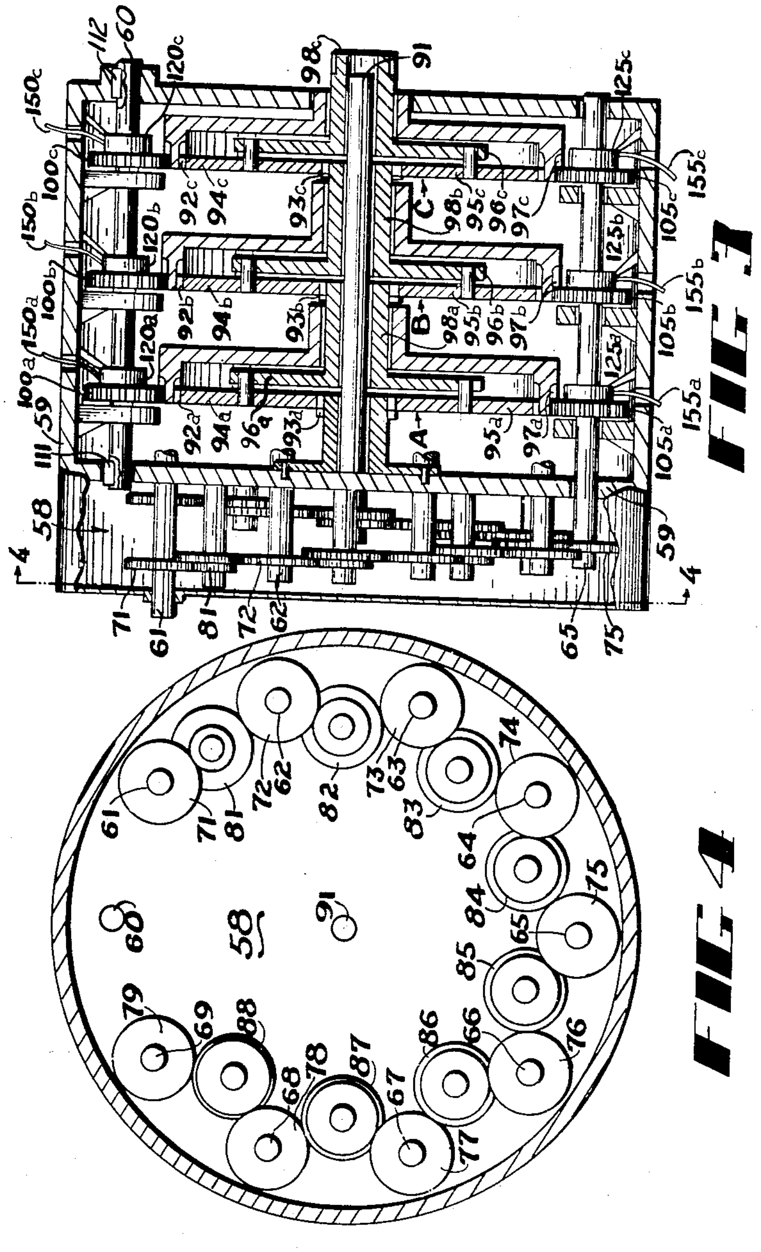
Figure 3 is another illustrative form of the invention utilizing the decade number system.
Figure 4 is a sectional view taken along section 4—4 in Figure 3.

Figure 3 shows a decade form of the invention in cross-section. It also has a design factor M equal to zero. The decade version of the invention requires fewer digital units than the binary system to obtain a similar number of output velocities. However, the decade system requires a more complex harmonic velocity generator.

A very desirable feature of a decade system is that it permits a control box that may provide a direct decimal reading of the output velocity of the system.

A harmonic velocity generator 58 shown in Figures 3 and 4 is supported in a frame 59 and includes an input shaft 61, that may for example be revolving at 100 revolutions-per-minute. Harmonic generator 58 has output shafts 60 through 69 that provide simultaneously both sets of velocities, $Y_{a \ldots k}$ and $Y_{d \ldots t}$, each set including the velocities, 500, 1000, 1500 through 4500 revolutions-per-minute in steps of 500 revolutions-per-minute. The zero velocity is obtained by providing a fixed relationship to frame 59, as was done in Figure 2. The transmission factor A is ⅕ in Figure 3, which will be explained below, to provide velocity sets, $W_{a \ldots k}$ and $W_{d \ldots t}$, that include the velocities 100, 200 300 through 900 revolutions-per-minute in steps of 100 R. P. M. Therefore, $R^F$ is 100 in Expressions 2 and 3 above.

A plurality of output gears 71 through 79, having the same diameters, are fastened to the respective output shafts 61 through 69. A plurality of dual idler gears 81 through 88 are consecutively engaged between gears 71 through 79. Each idler gear is comprised of two concentrically fixed gears that engage different output gears 71 through 79. The diameter ratio of the two fixed gears of each idler gear is as follows: 2/1 for gear 81, 3/2 for gear 82, 4/3 for gear 83, 5/4 for gear 84, 6/5 for gear 85, 7/6 for gear 86, 8/7 for gear 87, and 9/8 for gear 88.

The decade system of Figure 3 has three digital transmission units A, B, and C. Each digital unit is a planetary-gear system that is basically similar to the differential-gear units used in Figure 2. They are coaxially mounted on a shaft 91 centrally fixed through frame 59. Thus, in Figure 3, each planetary-gear unit has a ring gear 92, which has nine times as many teeth as its sun gear 93 to provide a nine-to-one ratio. They are connected by like planetary gears 94 and 95 which are symmetrically located on a carriage 96. Each ring gear 92 receives the input-Y for its digital unit from a plurality of transfer gears 100 through 109 that transfer the harmonic-generator output to the respective ring gears 92 through outer gear teeth 97 integrally formed with the ring gears.

Since input-X is zero for the first planetary gear unit A, its sun gear **93*a* is fastened to frame 59 by pins. Input-Y for digital unit A is received by ring gear 92 from one of the ten gears 100*a* through 109*a* connectable to harmonic generator 58** output shafts.

The output $Z_a$ of first digital unit A is taken from its planetary-gear carriage 96a and is transmitted through a coaxial shaft 98 to sun gear 93b of the next gear unit.

In a similar manner, second differential unit B receives an input-Y on its ring gear 92b from one of the ten gears 100b through 109b and provides an output Z from its planetary carriage 96b by a coaxial shaft 98b to the sun gear 93c of the last digital unit C, which is input-X for unit C. Likewise, unit C receives a Y-input on its ring gear 92 from one of the ten gears 100c through 109c and provides the output of the system from its coaxial output shaft 98c, which is connected to its planetary carriage 96c.

A clutching system provides the velocity selection means in Figure 3 to selectively provide the input-Y velocities to each of the decade digital units. The ten generator output shafts 60 through 69, which are best shown in Figure 4, provide the velocities $Y_{a \ldots k}$ in which shaft 60 provides zero velocity and is fixed by keys 111 and 112 to frame 59. Each of these shafts extends axially over the peripheries of the respective ring gears, and each has one of the sets of three gears 100 through 109 that respectively engage ring gear teeth 97. Shafts 61 through 69 are continually driven with harmonically-related velocities according to Expressions 6 and 7 above, except that Figure 3 uses the particular case of M being zero.

Figure 7:
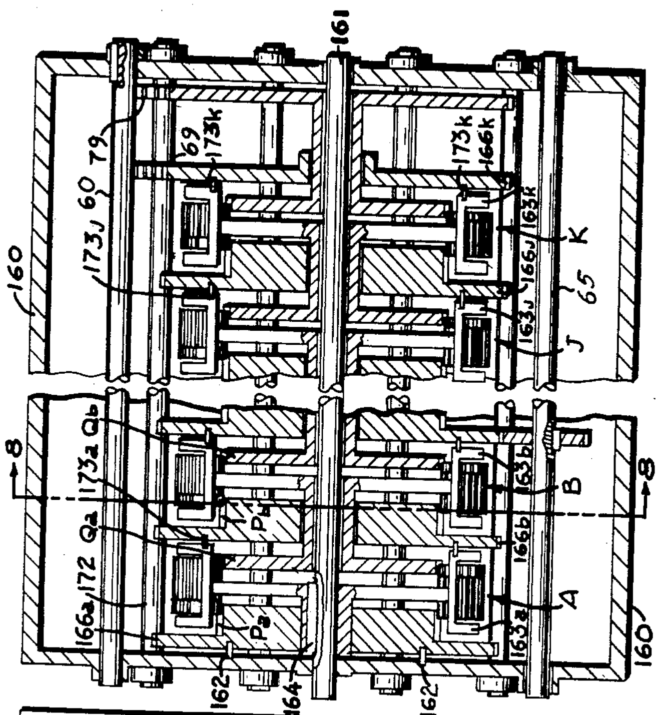
Figure 7 illustrates means for generating digitally-related rotational velocities.

Several systems may be provided to generate the harmonically-related velocities. Figure 4 shows one means for doing this. Figure 7 shows another system for generating the same set of velocities and will be explained below.

The velocity selection means in Figure 3 is a system of electromagnetically-operated clutches, for ease of remote control. Of course, a system of levers, like those in Figure 2, could be provided for direct control.

An electromagnetically-operated clutch 120 through 129 is provided respectively with each Y-input gear 100 through 109. Thus, there are ten Y-input gears and their clutches about each ring gear for a total of thirty in the system of Figure 3. Most of the generator output shafts are not shown in Figure 3 to assist clarity of the drawing.

Each clutch 120 through 129 is a two-position device similar to those shown in Figure 2. One clutch position locks its Y-input gear to its respective shaft; and the other clutch position unlocks the transfer gear from the shaft to allow free rotation between its gear and shaft. Preferably, de-energization of each electromagnetic clutch provides the unlocked gear condition, and energization provides the locked gear condition, since only one of the ten clutches about each ring gear will be locked at one time.

Consequently, any digital unit can be provided with any of the ten input velocities, that comprise the sets $Y_{a \ldots k}$ and $Y_{d \ldots t}$ merely by energizing the proper clutch. This can be done, for example, by providing a single-pole ten-throw control switch for each differential unit, wherein the pole of each switch is serially connected to a power source. Each of the contacts of a given switch will be connected to a different one of the clutches about a given ring gear. With this arrangement, only one ring-gear clutch can be energized at one time; and the setting of the switch can provide the proper digital indication. Hence, the ten switch positions of each switch should be indicated by the digits zero through nine to correspond respectively with the increasing order of the input velocities Y.

Figure 5:
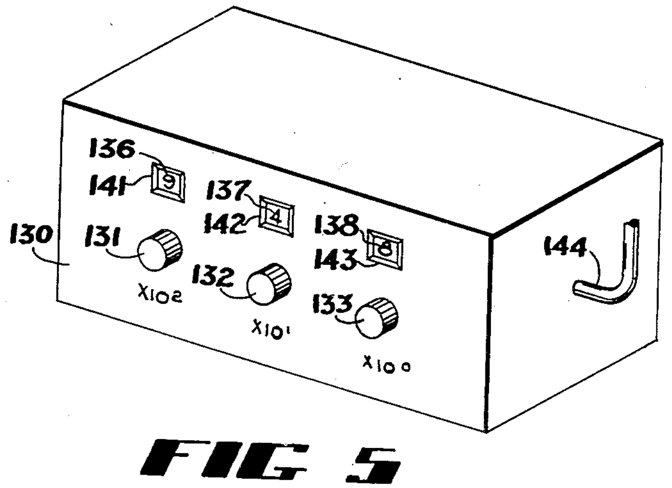
Figure 5 illustrates one type of control panel that may be used with the decade system of Figure 3.

Figure 5 illustrates one type of control panel 130, which may be used with the decade system of Figure 3. It shows knobs 131, 132 and 133, each operating a respective single-pole ten-throw control switch (not shown). Dials 136, 137, and 138 are circular in form and are fixed to the knobs 131, 132 and 133, respectively, behind control panel 130, so that the digital setting of each switch is indicated through the respective openings 141, 142 and 143 in the control panel, as shown in Figure 5.

Of course, the clutches may be operated mechanically rather than electromechanically, and accordingly, levers (not shown) may be provided which extend from each clutch through the frame to an external position where they may be operated. Furthermore, with a proper linkage mechanism, a single lever may be utilized with each digital unit to sequentially engage only one clutch at a time for the unit. The clutches will normally be spring biased to maintain each Y-input gear unlocked from its shaft when de-energized.

A multiwire cable 144 in Figure 5 connects the contacts of the switches behind control panel 130 to leads 150 through 159 that connect to the respective clutches in Figure 3.

Figure 7 shows another type of harmonic-velocity generator, which utilizes a system of differential gears of the type used in Figure 2 for an entirely different purpose. With a radix R, there will be required $(R-1)$ number of differential-gear units to generate the basic digital velocities in each set $Y_{a \ldots k}$ and $Y_{d \ldots t}$, which are the same only when M is zero. When the first velocity is zero $(R-2)$ differential-gear units are required.

The harmonic-velocity generator of Figure 7 has a frame 160, and an input shaft 161 rotationally supported along the axis of frame 160. A plurality of differential-gear units A, B. . J, K (identical to the digital units of Figure 2) are coaxially and rotatively supported (except for the carriage of the first unit A) on shaft 161.

Each differential gear unit has input velocities P and Q that are related to its output velocity V by the following formula:

$$P=2V-Q \tag{9}$$

where V is the rotational velocity of the carriage of the differential gear unit, and P and Q are the respective velocities of equal-sized gears that engage the carriage gears. Therefore, in Figure 7, the first input $P_a$ of the first differential unit is made zero by connecting gear $P_a$ to frame 160 by pins 162 to prevent its rotation. The carriage 163a of first unit A is fixed to a coaxial velocity-input shaft 161 by a key 164 and rotates at the velocity of input shaft 161 to provide the output velocity $V_a$ for first differential unit A, which also is provided as the lowest rotating output velocity of the generator which is removed from gear 166b through gear 71, shown in Figure 8. Gear 71 is fixed to rotatable shaft 61 that provides the lowest rotating output velocity Y of the generator.

The carriage 163a of first differential unit A is fixed by pins 173a to gear $P_b$ of the second unit B. The carriage velocity $V_b$ in second unit B will therefore be the same as the velocity of gear $Q_a$ in the first unit A. Thus, in second unit B, velocity $V_b$ will be twice the velocity of input shaft 161 and is removed from gear 166c.

In each following differential unit, its gear P is fastened by pins 173 to the carriage of the preceding unit so that they rotate together; and the carriage of each following differential gear unit is fastened to the Q-gear of the preceding unit.

The outputs in Figure 7 are taken respectively from gears 166 that rotate with the carriages of the immediately preceding differential unit. The output shafts 61 through 69 of the harmonic generator are each connected to a respective gear 71 through 79 that engages gears 166, respectively. Shaft 60 is fixed to frame 160 and provides the zero output velocity.

It will be found when applying Formula 9 to this arrangement that the velocities of the takeoff gears 166 increase in digital multiples of 2, 3, 4 etc. times the input velocity of input shaft 161 to provide the respective harmonically-related output velocities of the generator.

For a decade system with M equal to zero, the generator will have eight differential units to provide output velocities with submultiples of 0, 1, through 9, respectively.

The digital output velocity information provided by the system in Figure 7 may be conveyed to the decade units A, B and C in Figure 3 in the same manner as was done by the ten shafts 60 through 69 from generator 58 in Figures 3 and 4.

A planetary-gear arrangement of the type used in Figure 3 can be made to accommodate any numeral system used with this invention. It is only essential that the planetary gear unit, which comprises each digital unit, have the input-output relationships defined by Expression 5 above. A gear unit will provide this relationship for any number system if its ring gear has a number of teeth equal to $(R-1)$ times the number of teeth on its sun gear, with the carriage gears interconnecting the sun and ring gears.

It is, therefore, apparent that this invention provides a system for digitally varying the output velocity of an output shaft. It is capable of providing an extremely large number of digitally-related output velocities with relatively few mechanical units. Furthermore, the invention enables a direct-reading system for conveniently indicating in digital form to an operator the exact output velocity of an output shaft. Still further, it is apparent that the invention is capable of providing versatile control over its output velocities and readily permits punch-card or perforated tape control of its output velocities, when electromagnetically or hydraulically operated clutches are used, which also enable ease of remote control.

While particular forms of the invention have been shown and described, it is to be understood that the invention is capable of many modifications. Changes, therefore, in construction and arrangement may be made without departing from the scope of the invention as given by the appended claims.

I claim:

1. Means for digitally generating rotational velocities from a single rotating input shaft in a binary manner comprising a plurality of digital-units, with each digital-unit being a differential transmission having a pair of inputs X and Y, and the output-Z of each transmission being related to its inputs as follows $$Z=\frac{AY+X}{2}$$

a supporting frame, with the input-X to the first differential transmission being fixed to said frame, and the input-X to each transmission after the first being coupled to the output-Z of its immediately preceding transmission, a plurality of clutching means for respectively coupling said input shaft to the input-Y of each transmission, with each of said clutching means selectively locking the respective input-Y to said frame or to said rotating input shaft.

2. A system as defined in claim 1 comprising a supporting shaft axially mounted in said frame, with said differential transmissions being coaxially mounted on said shaft, the carriage of each differential transmission providing the output-Z of each digital unit, and the carriage of each unit except the last being coupled to one input gear of the immediately following differential transmission, with this input gear being input-X of its respective unit, wherein the carriage of the last unit provides the output of the system; a plurality of transfer gears received on said input shaft, with one of said transfer gears being provided with each of said differential units, means coupling said transfer gears respectively to the other input gear of each differential transmission, one of said clutching means associated with each of said transfer gears, each of said clutching means having two states, with one state locking the respective transfer gear to said frame, and the other state locking its respective gear to said input shaft, and a plurality of clutch positioning control means, with each of said control means having two positions correlated with the binary digits zero and one, with position zero causing its clutching means to lock its input-shaft gear to said frame, and with position one causing its respective clutching means to lock its transfer gear to said rotating input shaft.

3. A system as defined in claim 2 comprising memory means for remembering a plurality of binary sequences, with said binary sequences respectively corresponding to a different digital-transmission unit, and means for actuating the clutching means of the respective digital-transmission units in response to the corresponding binary sequences of said memory means.

4. A system as defined in claim 3, wherein a perforated tape comprises said memory means with said tape formed with a plurality of longitudinal rows of perforations, with each row correlated with one of said digital-units, wherein each perforation in said tape represents one input state for the respective digital-unit and lack of perforation represents the other input state for the respective digital-unit, and means for actuating the respective clutching means in response to the perforation sequence of said tape.

5. A system for digitally-generating rotational velocities in a binary manner from a single input shaft rotating at a given velocity comprising a frame member, and a supporting shaft mounted within said frame member, a plurality of differential transmission units, with each unit having a first gear rotatably mounted on said supporting shaft, a carriage member rotatably mounted on said supporting shaft, and a second gear rotatably supported on said carriage and having the same number of teeth as said first gear, a third gear concentrically fixed with said second gear, a pair of meshing carriage gears rotatably supported by said carriage, with one of said carriage gears engaging said first gear, and the second of said carriage gears engaging said second gear; said plural differential-transmission units being axially aligned on said supporting shaft, with the carriage of each differential transmission unit except the last connected to the first gear of the immediately following differential transmission unit, and the first gear of said first unit being fixed to said frame; a plurality of transfer gears received on said input shaft, with said transfer gears engaging respectively the third gear in said differential-transmission units, a plurality of projections fixed to said frames, with each projection being adjacent to one of said transfer gears, a plurality of clutch means, with each of said clutch means being supported adjacent to one of said transfer gears, each of said clutch means being capable of alternately locking its respective transfer gear to said input shaft and locking said transfer gear to its respective frame projection free of said shaft rotation, and a plurality of control means, with each control means connected to one of said clutches to actuate it to its respective positions, whereby the output of said system is taken from the carriage of the last differential transmission unit and its output velocity is controllable in a binary manner by the dual settings of said control means.

6. Means for digitally-generating and digitally-controlling output rotational velocities from a pair of input-velocity sets $Y_{a\ldots k}$ and $Y_{d\ldots t}$, with each set including R number of consecutive velocities that are harmonically related after multiplication by a common factor A, comprising a plurality of digital-unit means, each having two inputs X and Y, and each unit means including means for providing a velocity output-Z related to its respective inputs X and Y by the expression $$Z=\frac{AY+X}{R}$$

where R is the radix of a chosen number system, a given reference velocity providing the input-X to the first digital-unit means, and the input-X of each following digital-unit means coupled to the output-Z of its immediately preceding digital-unit means, the input-Y to the first digital-unit means being one velocity selected from the set $Y_{d \ldots t}$, the input-Y to each following digital-unit being one velocity selected from the set $Y_{a \ldots k}$, a plurality of single-digit-control means, with a different single-digit-control means being provided with each digital-unit, each single-digit-control means providing one digit in a numerical sequence representing said output velocity and being calibrated with the basic digits of the chosen number system, with the basic digits of the indicating means associated with the first digital-unit means having its basic digits correlated with the consecutive harmonic velocities in the set $Y_{d \ldots t}$, and with the single-digit-control means associated with each respective following digital-unit means having its basic digits consecutively correlated with the harmonic velocities in the set $Y_{a \ldots k}$.

7. Means for digitally-generating and indicating rotational velocities, comprising single input velocity means, means for generating R number of consecutive harmonically-related rotational velocities with the lowest velocity being zero, where R is the radix of the chosen number system, a plurality of digital-unit means, each having two velocity inputs Y and X, and means for providing a velocity output-Z related to its inputs Y and X by the expression $$Z=\frac{AY+X}{R}$$

where A is a constant number, with the input-X to the first digital unit being zero, and the input-X to each following unit being connected to the output-Z of its adjacent prior unit, means for coupling any one of the outputs of said harmonic-velocity generating means to the input-Y of each digital-unit, each harmonic velocity being a different one of the basic digits in the chosen number system multiplied by A and by R to an integer power, a plurality of indicating means for numerically indicating the output velocity of the system, each indicating means providing a read-out of a single digit of the output velocity, with a different indicating means being associated with each digital unit, with each indicating means calibrated in the basic digits of the chosen number system, and with the basic digits of each indicating means correlated with the harmonic velocity outputs of the harmonic-velocity generating means.

8. Means for digitally-generating and indicating rotational velocities comprising harmonic-generating means for providing two sets of outputs $W_{a \ldots k}$ and $W_{d \ldots t}$, with each set having R number of harmonically-related velocities, each velocity being multiplied by a factor $1/A$, with the velocities in each set being spaced by increments of $R^F$ revolutions-per-unit-of-time, where R is the radix of the chosen number system, and F is an integer power, with the lowest velocity in the set $W_{a \ldots k}$ being equal to $R^FM(R-1)$, in which M is a design factor that may be any integer including zero, and the highest velocity in the set $W_{d \ldots t}$ being equal to $R^F(M+1)\ (R-1)$; a plurality of digital-unit means, each having two velocity inputs W and X, and each including means for providing a velocity output-Z related to its respective inputs W and X by the expression $$Z=\frac{W+X}{R}$$

means having a transmission factor A for selectedly coupling any of the velocities from the set $W_{d \ldots t}$ to the input-W of the first digital-unit means, with the input-X of the first digital-unit means being held at a fixed-reference velocity, further means having a transmission factor A for selectedly coupling any of the velocities from the set $W_{a \ldots k}$ to input-W of each digital-unit means except said first digital-unit means, a plurality of indicating means respectively associated with said plural digital-unit means, each indicating means controlled by a single respective digit in a number representing said output velocity, each indicating means being calibrated in the basic digits of the chosen-number system having the radix R, with the indicating means associated with the first digital-unit means having its basic digits correlated in respectively increasing order with the velocities in the set $W_{d \ldots t}$, and with the respective indicating means associated with the following digital-unit means each having its basic digits correlated in respectively increasing order with the velocities in the set $W_{a \ldots k}$, wherein the output velocity of the system is indicated by a digital number comprised of the digits corresponding to the selected input-W velocities of the respective digital-unit means.

9. Means for generating and decimally indicating rotational velocities in a decade manner comprising harmonic-generating means for providing two sets of outputs $W_{a \ldots k}$ and $W_{d \ldots t}$, with each set having ten harmonically-related velocities, with the velocities in each set being spaced by increments $10^F$ revolutions-per-unit-of-time, where F is an integer power, with the lowest velocity in the set $W_{a \ldots k}$ being equal to $10^FM9$, in which M is a design factor that may be any integer including zero, and the highest velocity in the set $W_{d \ldots t}$ being equal to $10^F(M+1)9$, with the velocities in each set being multiplied by the factor $1/A$; a plurality of digital-unit means, each having two velocity inputs W and X, and each including means for providing a velocity output-Z related to its respective velocity inputs W and X by the expression $$Z=\frac{W+X}{10}$$

means having a transmission factor for selectedly coupling any of the velocities from the set $W_{d \ldots t}$ to the input-W of the first digital-unit means, with the input-X of the first digital-unit means being held at a fixed-reference velocity, and further means having a transmission factor A for selectedly coupling any of the velocities from the set $W_{a \ldots k}$ to the input-W of each digital-unit means respectively following said first digital-unit means, a plurality of indicating means, each controlling a single decimal digit of the output velocity, each indicating means being calibrated with the digits zero through nine, one indicating means being associated with the first digital-unit means and having its basic digits correlated in respectively increasing order with the velocities in the set $W_{d \ldots t}$, and the remaining indicating means being associated respectively with the remaining digital-unit means, and each remaining indicating means having its basic digits correlated in increasing order with the velocities in the set $W_{a \ldots k}$, wherein the output velocity of the system is indicated in the decade manner by the digits corresponding to the selected input velocities to the digital-unit means.

10. Means for generating and indicating rotational velocities, comprising harmonic-generating means for providing ten harmonically-related output velocities including zero velocity, with said velocities being spaced by increments of $10^F/A$ revolutions-per-unit-of-time, where F is an integer power, and $1/A$ is a common transmission factor; a plurality of digital-unit means, each having two velocity inputs W and X, and each digital-unit means including means for providing a velocity output-Z related to its respective inputs W and X by the expression $$Z=\frac{W+X}{10}$$

means having a transmission factor A for selectedly coupling any of said harmonically-related velocities to the input-W of the respective digital-unit means, with the input-X of the first unit being zero revolutions-per-unit-of-time, and the input-X of each following unit being connected to the output of its immediately preceding unit, a plurality of indicating means, each indicating only a single respective digit of the output velocity, with each indicating means associated with a different one of said digital-unit means, and each indicating means being calibrated with the digits zero through nine that are correlated in harmonic order with the respective input velocities.

11. A system for digitally-generating and controlling rotational velocities in a decade manner, comprising nine rotating input shafts and a fixed input shaft, with said nine shafts being rotated at consecutive velocity multiples of $10^F/A$ revolutions-per-unit-of-time; a frame, a supporting shaft axially mounted in said frame, a plurality of planetary-gear units mounted coaxially on said supporting shaft, with each planetary unit comprising a ring gear and a sun gear having a teeth ratio of nine-to-one with said planetary units rotatably mounted on said supporting shaft except for the sun gear of the first unit which is fixed to said frame, the carriage of each planetary unit except the last being coupled to the sun gear of the immediately following unit; a plurality of coupling gears, with one formed about each ring gear; said input shafts being located about all of said planetary units; a plurality of transfer gears respectively mounted on each of said input shafts, with the transfer gears on each input shaft respectively engaging each coupling gear, a plurality of clutches, with a different clutch associated with each transfer gear, each clutch actuating its transfer gear to two states, one state being the locking of said transfer gear to its respective shaft, and the other state being the release of said transfer gear rotatively free of its respective shaft, with all of said transfer gears except one about each planetary unit being rotatively free of their input shafts, and with one transfer gear locked to its shaft about each planetary unit, a plurality of single-digit-control means, each controlling a single digit of the output velocity of the system, with a different single-digit-control means being provided for each of said planetary-gear units, each single-digit-control means being calibrated with the digits zero through nine, means for actuating the respective clutches about each planetary-gear unit in response to the setting of said indicating means, with said basic digits of each single-digit-control means being correlated with the clutches about its respective planetary unit according to the input velocities of the shafts receiving said clutches, and the actuated clutch about each planetary unit locking its transfer gear to its input shaft.

12. A system as defined in claim 11 in which each of said clutches is electromagnetically operated, a plurality of switches respectively comprising said single-digit-control means, each of said switches associated with a different one of said planetary-gear units, each switch having at least a single pole and ten contacts, a power source connected to each of said poles the contacts of each switch respectively connected to the clutches about its respective planetary gear unit, with its contacts correlated to the basic digits zero through nine, each of said clutches normally permitting free rotation of its transfer gear on its respective input shaft when de-energized, a plurality of indicating means, each calibrated with the digits zero through nine and associated with a different one of said switches to indicate which contact is being engaged by its pole, with the energized clutch about each planetary unit locking its respective transfer gear to its input shaft.

References Cited in the file of this patent

UNITED STATES PATENTS 1,967,559 Schreck ---------------- July 24, 1934

FOREIGN PATENTS 993,881 France ---------------- Aug. 3, 1951